United States Patent [19]
Hassenpflug

[11] Patent Number: 4,922,258
[45] Date of Patent: May 1, 1990

[54] METHOD FOR DETERMINING AIRCRAFT FLIGHT ALTITUDE

[75] Inventor: Wolfgang Hassenpflug, Freiburg i. Br., Fed. Rep. of Germany

[73] Assignee: LITEF GmbH, Freiburg im Breisgau, Fed. Rep. of Germany

[21] Appl. No.: 119,576

[22] Filed: Nov. 12, 1987

[30] Foreign Application Priority Data

Nov. 12, 1986 [EP] European Pat. Off. ......... 86 710 007

[51] Int. Cl.$^5$ .............................................. G01S 3/02
[52] U.S. Cl. .................................................. 342/462
[58] Field of Search ............... 342/462, 120, 121, 123, 342/125

[56] References Cited

U.S. PATENT DOCUMENTS 4,144,571 3/1979 Webber ............................... 364/450
4,431,994 2/1984 Gemin .

*Primary Examiner*—Theodore M. Blum
*Attorney, Agent, or Firm*—Elliott N. Kramsky

[57] ABSTRACT

A method for determining the flight altitude h above ground of an aircraft equipped with a radar altimeter and an additional (baro-inertial) altitude measuring device or a course and position reference system capable of determining altitude. The method relies upon restriction of high-frequency emissions from the radar altimeter to very short periods of time. The radar altimeter measures $h_{RO}$ within the high-frequency intermission intervals to calibrate the altitude value supplied by the other altitude-measuring device. The method permits the omission of any radar altimeter from aircraft-launched missiles without degrading system performance.

2 Claims, 1 Drawing Sheet

METHOD FOR DETERMINING AIRCRAFT FLIGHT ALTITUDE

BACKGROUND

1. Field of the Invention

This invention relates to methods for determining the altitude of an aircraft. More particularly, this invention pertains to such a method for use in an aircraft that is equipped with a radar altimeter and an additional non-radiating flight altitude measuring device.

2. Description of the Prior Art

A radar altimeter is often used to determine the altitude above ground of an aircraft (including fixed-wing and rotor aircraft and missiles). A disadvantage of the use of such device is the emission of high-frequency power whose reception may enable detection and location of the aircraft. Detection range increases with altitude above ground, angular position and emitted power. Since, on modern radar altimeters, for example, power is controlled as a function of the signal-to-noise ratio of the received signal, that emitted power increases with altitude.

SUMMARY AND OBJECTS OF THE INVENTION

It is, therefore, an object of this invention to reduce the probability of detection of an aircraft as a consequence of high-frequency radar altimeter emissions to a substantial degree.

This and other objects are achieved by the present invention that provides a method for determining the altitude above ground (h) of an aircraft equipped with a radar altimeter and a flight-altitude measuring device Such method includes intermittently repeating the high-frequency signal for obtaining radar altitude ($h_{RO}$). The intermission intervals between such repetitions of the high-frequency signal are substantially longer than the transmission time required to obtain a valid radar altimeter measurement whereby the high-frequency repeated signals are relatively brief. In different aspects, in the method of the invention, (1) the time interval between successive repetitions of the high frequency signal is controlled to be a random variable having a given statistical distribution between minimum and maximum durations and (2) the rate of repetition of the high frequency is adjusted to correspond approximately to the rate of variation in height of the overflown terrain.

The current value of the radar altimeter $h_{RO}$ is subtracted from the altitude value ($h_B$) that is supplied by the flight-altitude measuring device. The difference ($\delta h$) is then stored for at least the duration of the following transmission interval. Thereafter the current valid altitude h is provided as an altitude value corrected by the amount of the stored difference $\delta h$.

The foregoing features and advantages of the invention will become further apparent from the detailed description that follows. This description is accompanied by a set of drawing figures which includes numerals that correspond to numerals of the written description, like numerals referring to like features throughout.

DETAILED DESCRIPTION

Figure 1:
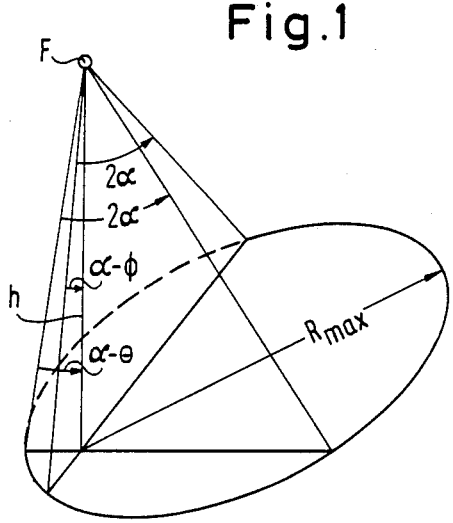
FIG. 1 is diagram that illustrates the angular relationships involved in the determination of ground range and altitude above ground with an aircraft-bound radar altimeter.

FIG. 1 is a diagram that illustrates the various angular relationships which are relevant to determination of ground range and the altitude above ground of an aircraft-bound radar altimeter. In accordance with such figure: F1 F=the aircraft;

$\alpha$ or $2\alpha$ =the emission angle;

h=the altitude above ground;

$\Phi, \theta$ =the angular positions (roll angle and pitch angle); and $R_{max}$ =the maximum (theoretical) range on the ground.

The following relationship for the maximum ground range applies:

$$R_{max} = h \cdot \cos(\tfrac{1}{2}\pi - \Phi - \theta) \cdot \{t_g(\alpha + \Phi)^2 + t_g(\alpha + \theta)^2\}^{\tfrac{1}{2}} \qquad (1)$$

(It is assumed that, for $\Phi$ or $\theta \geq \alpha$, the radar altimeter is not used to determine the altitude above ground. On many radar altimeters used, $\alpha \approx 20°$.)

In the invention the altitude above ground of an aircraft equipped with a radar altimeter and with a further flight-altitude measuring device such as a barometric altitude-measuring device linked to an inertial navigation system or an inertial altitude-measuring device, is determined by repeating the high-frequency signal for obtaining the radar altimeter $h_{RO}$. In each measuring process, however, that signal is emitted only briefly and at intermission intervals that are substantially longer than the transmission time required to obtain a valid radar altitude measurement. The particular current value of $h_{RO}$ is subtracted from the altitude value $h_B$ supplied by the other flight-altitude measuring device to form a difference ($\delta h$) that is stored for at least the duration of the following intermission interval. The particular current valid altitude h is provided as an altitude value $h_B$ corrected by the stored difference $\delta h$. Thus, in the invention, continuous radar altitude measurement, which can greatly impair the probability of aircraft survival is not employed. High-frequency emissions from the radar altimeter are suppressed during most of the flight duration as the radar altimeter is employed solely to calibrate the pressure altitude (alternatively, the altitude value obtained from the baro-inertial loop of an inertial navigation system or the inertial altitude value supplied by a course and position reference system).

Figure 2:
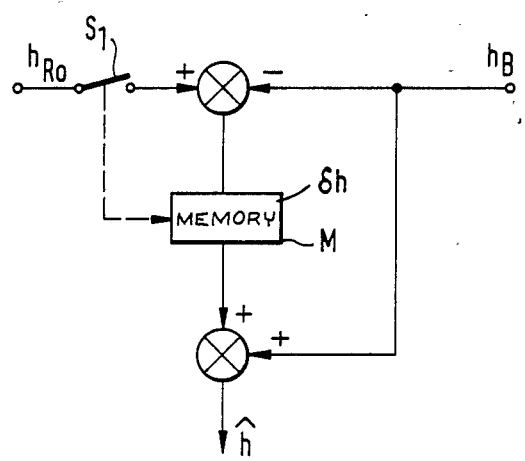
FIG. 2 is a block diagram for illustrating the method of the invention.

FIG. 2 is a block diagram that illustrates the operation of the method of the invention.

According to FIG. 2, the calibration of pressure or inertial altitude values can occur by forming the difference, $\delta h$, for example, between the pressure altitude or inertial altitude ($h_B$) and the radar altitude $h_{RO}$, by closing a switch $S_1$ that is representative of an emission of the radar altimeter. The difference $\delta h$ is stored in a memory M for at least the duration of the high-frequency intermission interval and is added, with the correct sign, to the pressure or inertial altitude value $h_B$. The altitude value h obtained and provided represents the altitude above ground during calibration and for the duration of the following intermission interval until the next radar altitude measurement is available. That value corresponds to the continuous value of the pressure or inertial altitude $h_B$ corrected by the amount of the calibration value or difference $\delta h$.

As seen in FIG. 2:

$$\delta h = h_B - h_{RO} \quad (2)$$

and $$h = h_B + h \quad (3)$$

The calibration intervals for the difference $\delta h$ may be periodic or may vary within fixed time-interval limits according to a statistical coding. The maximum time between two successive calibrations depends on the weather and is affected by air-pressure variations that effect pressure. Inertial altitude, flight altitude and the undulation of the terrain also effect the intervals. When terrain undulates sharply, comparatively frequent radar altimeter measurements are required for obtaining the calibration value or the pressure difference $\delta h$. The range is usually smaller in such an application. However, due to the greater high-frequency emission, the invention is also especially advantageous over relatively level terrain for reducing detection probability.

Since high-frequency emission is restricted, it is possible, on rockets and so-called SRSOMs (Short Range Stand-Off Missiles), to eliminate the radar altimeter completely, as the above-described calibration of pressure or inertial altitude may be carried out before the missile is launched from a carrier aircraft.

Thus it is seen that the present invention provides a method for substantially reducing the probability of detection of an aircraft as a consequence of high-frequency radar altimeter emissions.

While this invention has been described with reference to a presently-preferred embodiment, it is not confined thereto. Rather, this invention is limited only insofar as defined by the following set of claims and includes all equivalents thereof.

What is claimed is:

1. A method for determining the altitude above ground (h) of an aircraft that is equipped with a radar altimeter and a flight-altitude measuring device comprising the steps of:
   (a) intermittently repeating the high-frequency signal for obtaining radar altitude ($h_{RO}$);
   (b) the intermission intervals between repetitions of said high-frequency signal being substantially longer than the transmission time required to obtain a valid radar altimeter measurement whereby said high-frequency repeated signals are relatively brief and the time interval between successive repetitions of said high-frequency signal is controlled to be a random variable having a given statistical distribution between predetermined minimum and maximum durations; then
   (c) subtracting the current value of radar altitude $h_{RO}$ from the altitude value ($h_B$) that is supplied by said flight-altitude measuring device; and
   (d) storing the difference ($\delta h$) for at least the duration of the following transmission interval; and then
   (e) providing the current valid altitude h as an altitude value $h_B$ corrected by the amount of said stored difference $\delta h$.

2. A method for determining the altitude above ground (h) of an aircraft that is equipped with a radar altimeter and a flight-altitude measuring device comprising the steps of:
   (a) intermittently repeating the high-frequency signal for obtaining radar altitude ($h_{RO}$);
   (b) the intermission intervals between repetitions of said high-frequency signal being substantially longer than the transmission time required to obtain a valid radar altimeter measurement whereby high-frequency repeated signals are relatively brief and the rate of repetition of said high-frequency signal is adjusted to correspond approximately to the rate of variation in height of the overflown terrain; then
   (c) subtracting the current value of radar altitude $h_{RO}$ from the altitude value ($h_B$) that is supplied by said flight altitude measuring device; and
   (d) storing the difference ($\delta h$) for at least the duration of the following transmission interval; and then
   (e) providing the current valid altitude h as an altitude value $h_B$ corrected by the amount of said stored difference $\delta h$.

* * * * *